(12) United States Patent
Brewer et al.

(10) Patent No.: US 7,596,558 B2
(45) Date of Patent: Sep. 29, 2009

(54) SYSTEM AND METHOD FOR OBTAINING USER FEEDBACK FOR RELEVANCE TUNING

(75) Inventors: Brett D Brewer, Sammamish, WA (US); Oliver Hurst-Hiller, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 11/107,870

(22) Filed: Apr. 18, 2005

(65) Prior Publication Data

US 2006/0235860 A1 Oct. 19, 2006

(51) Int. Cl.
*G06F 7/00* (2006.01)
(52) U.S. Cl. ............................................... 707/5; 707/7
(58) Field of Classification Search ............... 707/1–10, 707/100–102
See application file for complete search history.

(56) References Cited

U.S. PATENT DOCUMENTS

| | | | |
|---|---|---|---|
| 6,590,586 B1* | 7/2003 | Swenton-Wall et al. ..... | 715/730 |
| 6,990,628 B1* | 1/2006 | Palmer et al. ............... | 715/234 |
| 7,149,983 B1* | 12/2006 | Robertson et al. ........... | 715/810 |
| 2002/0032675 A1* | 3/2002 | Williamowski et al. ........ | 707/3 |
| 2003/0036927 A1* | 2/2003 | Bowen .......................... | 705/4 |
| 2003/0050927 A1* | 3/2003 | Hussam ......................... | 707/5 |
| 2003/0164844 A1* | 9/2003 | Kravitz et al. ............... | 345/700 |
| 2004/0230572 A1* | 11/2004 | Omoigui ....................... | 707/3 |
| 2004/0267700 A1* | 12/2004 | Dumais et al. ................ | 707/2 |
| 2006/0036567 A1* | 2/2006 | Tan .............................. | 707/1 |
| 2007/0106654 A1* | 5/2007 | Bookstaff ..................... | 707/4 |

\* cited by examiner

*Primary Examiner*—Wilson Lee
(74) *Attorney, Agent, or Firm*—Shook, Hardy & Bacon L.L.P.

(57) ABSTRACT

A system and method are provided for facilitating user feedback pertaining to search results produced by a search system in response to an input user query. The system may include an edit mode activation option provided in conjunction with the search results. The system may additionally include result manipulation tools triggered in response to a user selection of the edit mode activation option, the result manipulation tools allowing the user to manipulate the search results. The result manipulation tools may include a sorting interface for allowing a user to sort search results. The system may further include a feedback receiving mechanism for receiving and storing the user-manipulated search results for future ranking input or search result personalization input.

19 Claims, 6 Drawing Sheets

SYSTEM AND METHOD FOR OBTAINING USER FEEDBACK FOR RELEVANCE TUNING

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for providing relevant search results in response to a user query and in particular to facilitating user input for relevance determination.

BACKGROUND OF THE INVENTION

Through the Internet and other networks, users have gained access to large amounts of information distributed over a large number of computers. In order to access the vast amounts of information, users typically implement a user browser to access a search engine. The search engine responds to an input user query by returning one or more sources of information available over the Internet or other network.

The search engine typically performs two functions including (1) finding matching documents and (2) scoring the matching documents to determine a display order. The search engines typically order or rank the results based on the similarity between the terms found in the accessed information sources to the terms input by the user. Results that show identical words and word order with the request input by the user are given a high rank and will be placed near the top of the list presented to the user.

Scoring performed by different search engines takes into account various factors including whether a match was found in the title, the importance of the match, the importance of a phrase match, and other factors determined by the search engine. Parameters that work well for one kind of search may not work well for all searches and parameters that work for some users may not work well for others.

A problem with most currently known techniques is the failure to consider user input in determining the relevance of search results. Users are unable to ensure that the results will be output in an appropriate order of relevance. Optimizing search result ranking is difficult for many reasons, one of them being the difficulty inherent in accurately and cost effectively generating testing and training data with which to measure and train new ranking algorithms. The user base of searchers will generally be the best source for high quantity testing and training data. However, requests to end users to provide more testing and training data have been met with limited success.

The limited success stems from the fact that providing feedback is often cumbersome and time consuming for users. Furthermore, pre-configured feedback formats are often inadequate. For example, a user can report to a search system that for the query "foo", search result number 3 is not a relevant result, but more context is often needed to make this feedback useful. For example, the search system may need to determine how the evaluated result compares with the remaining results presented. Furthermore, the ranking components of the search system may want to ascertain whether the results were ordered correctly and how the ordering could be improved. Finally, the search system needs to know if a useful result failed to appear or if any results that were produced were useless.

One currently available feedback system involves a highly controlled testing environment in which paid search result judges create ideal result sets including 10 to 100 search results for a single query. The paid search result judges group the results into relevance categories. The relevance categories may be identified by labels such as "perfect", "excellent", "good", "poor", etc. However, the tools the judges use for this data collection are not user friendly and the task is too laborious to expect search system users to provide this data without compensation.

User satisfaction is a critical success factor for a search engine. Accordingly, a solution is needed that fully considers user input regarding search engine performance and results. A user-friendly solution to enable end-users to easily create ideal result sets would provide a significant advantage.

BRIEF SUMMARY OF THE INVENTION

Embodiments of the present invention include a system for facilitating user feedback pertaining to search results produced by a search system in response to an input user query. The system may include an edit mode activation option provided in conjunction with the search results and result manipulation tools triggered in response to a user selection of the edit mode activation option. The result manipulation tools may allow the user to manipulate the search results. A feedback receiving mechanism may receive and store the user-manipulated search results.

In an additional aspect, a method is provided for facilitating user feedback pertaining to search results produced by a search system in response to an input user query. The method may include providing an edit mode activation option in conjunction with the search results. The user selection of the edit mode activation option triggers a feedback interface including result manipulation tools. The method may additionally include manipulating results in accordance with user input to the result manipulation tools and storing the manipulated results for use by a ranking system.

In yet a further aspect, a method is provided for facilitating user feedback pertaining to search results produced by a search system in response to an input user query. The method may include providing an edit mode activation option in conjunction with the search results, wherein user selection of the edit mode activation option triggers a feedback interface including result manipulation tools. The method may additionally include manipulating results in accordance with user input to the result manipulation tools and providing a preview pane for reviewing the manipulated results prior to submission.

BRIEF DESCRIPTION OF THE DRAWINGS

The present invention is described in detail below with reference to the attached drawings figures, wherein.

DETAILED DESCRIPTION OF THE INVENTION

I. System Overview

Figure 1:
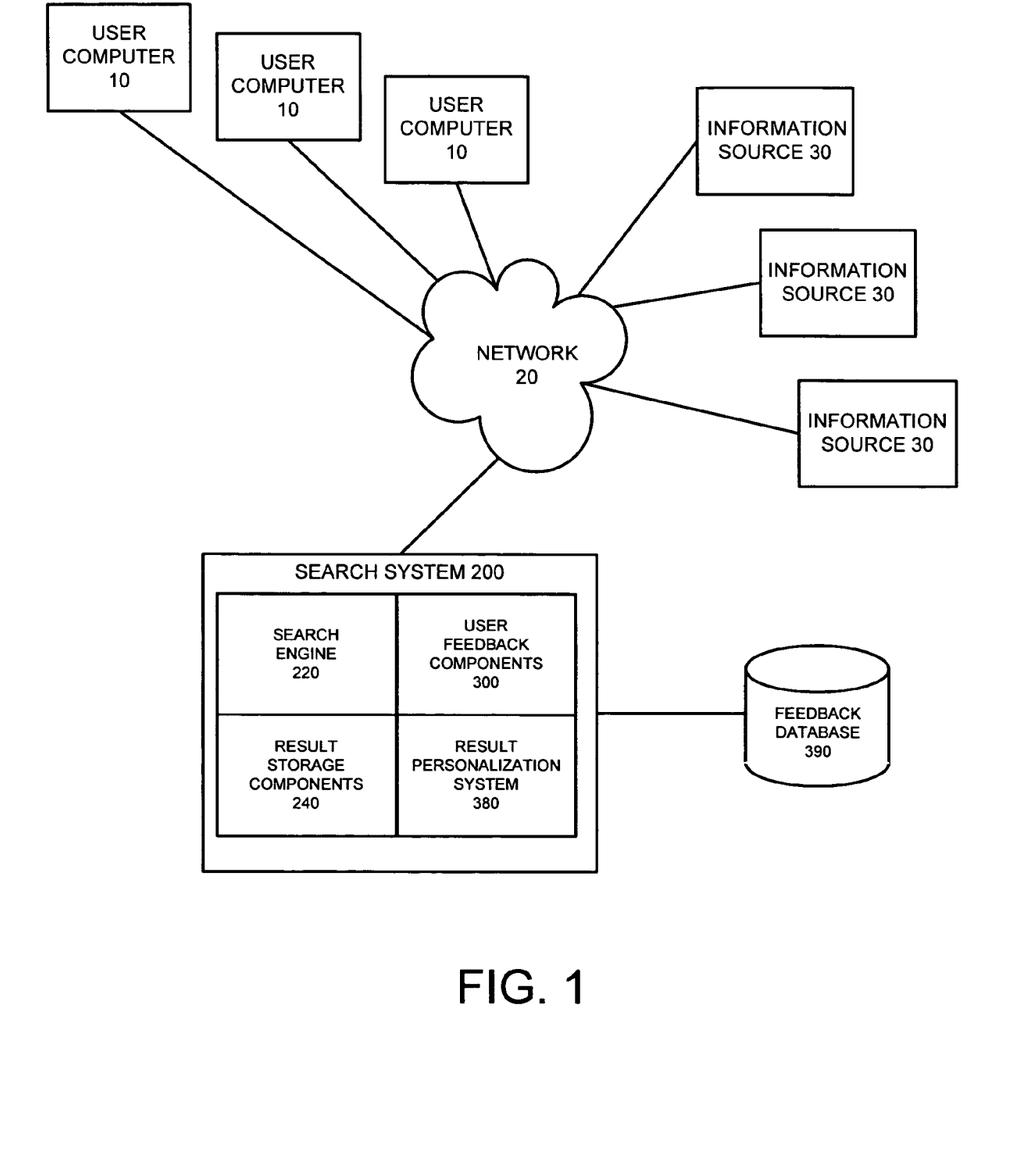
FIG. 1 is a block diagram illustrating an overview of a system in accordance with an embodiment of the invention.

A system and method are provided for facilitating user feedback contributions for evaluating search results. As illustrated in FIG. 1, a plurality of user computers 10 may be connected over a network 20 with a search system 200. The search system 200 may respond to a user query by searching a plurality of information sources such as web sites 30. The search system 200 may include a search engine 220, result storage components 240, user feedback components 300, and a result personalization system 380. The user feedback components 300 may deliver feedback data to a feedback database 390.

In operation, the search engine 220 may include a crawler that traverses the information sources 30 and indexes and stores results in results storage components 240. The search engine 220 may additionally include a ranking mechanism for ranking all located matches in response to an input user query. The results storage components 240 may include a cache for recently stored results and an index system for storage of additional results. The user feedback components 300 preferably provide a user interface that efficiently allows a user to provide feedback. The feedback can be stored in the feedback database 390 for subsequent use by the search system 200 for optimization of future search results. The user feedback components 300 may also feed data to the result personalization system 380, which may operate to optimize search results for a particular user. Although the aforementioned components are shown as integrated with the search system 200, one or more of the components may exist as separate and discrete units or systems. The search engine 200 may include additional known components, omitted for simplicity. Furthermore, although the system is shown in the displayed embodiment as connected over the network 20 with the user computers 10, the system may also be implemented as a desktop search tool.

As set forth above, optimizing search result ranking is challenging due to the difficulty inherent in accurately and cost effectively generating testing and training data with which to measure and train new ranking algorithms. Embodiments of the invention, through the user feedback components 300, provide a friendly interface to enable end-users to easily create ideal result sets by enabling highly actionable user feedback to be gathered on a large scale from willing users. Specifically, embodiments of the invention enable a user to switch easily from a standard search results page to a result edit mode page. The result edit mode may implement a dynamic drag-and-drop re-ordering interface to allow re-ordering of results. The result edit mode may also allow for deletion of irrelevant or bad results and addition of missing results. The results editing mode may further allow for labeling of results based on relevance, such as 'highly relevant,' 'somewhat relevant,' 'not relevant', and for labeling results as spam or adult-oriented, etc. A preview mode may allow confirmation of entered edits.

II. Exemplary Operating Environment

Figure 2:
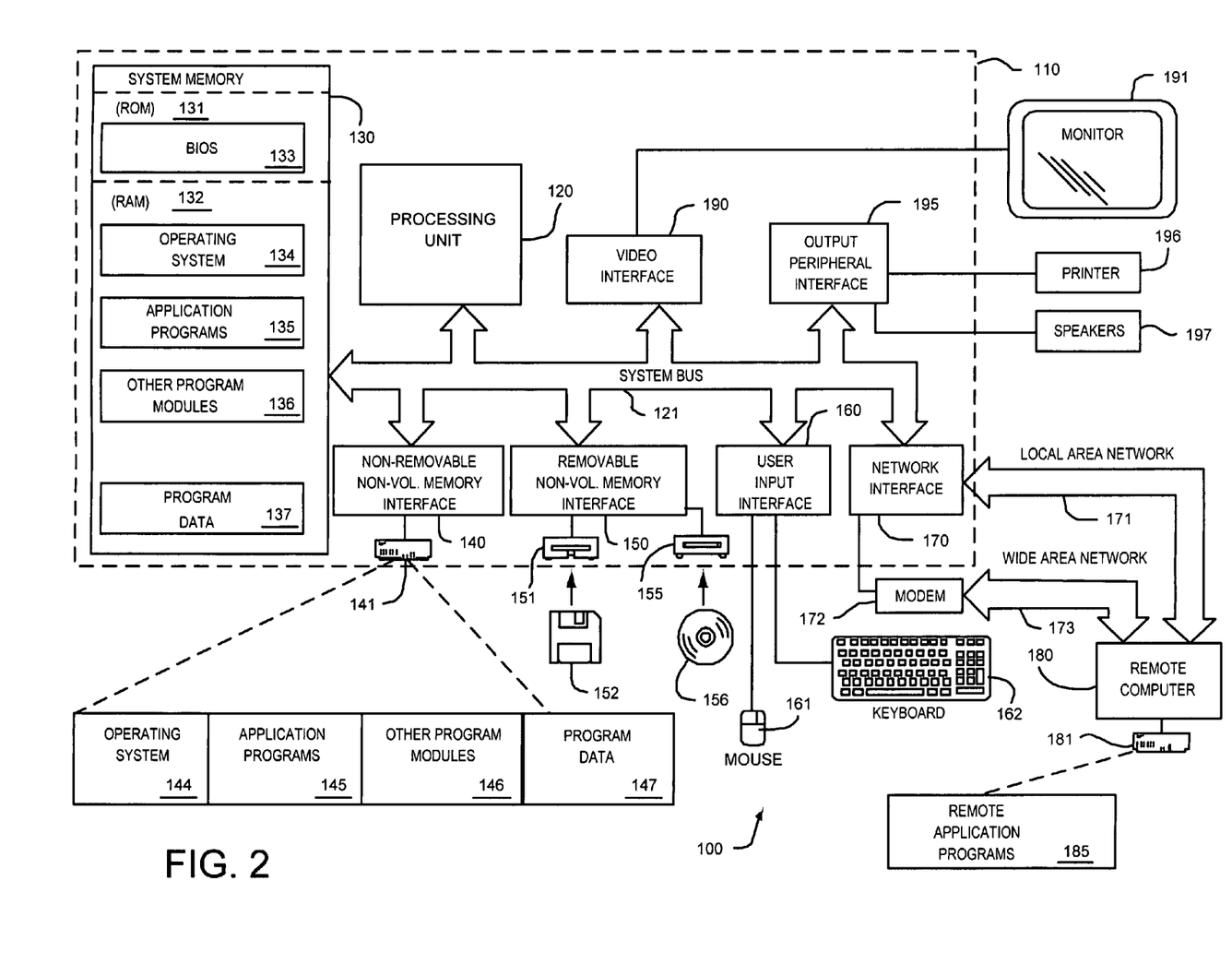
FIG. 2 is block diagram illustrating a computerized environment in which embodiments of the invention may be implemented.

FIG. 2 illustrates an example of a suitable computing system environment 100 on which the system for obtaining user feedback for relevance tuning may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system for facilitating user feedback for relevance tuning in accordance with an embodiment of the invention. The system may include user computers 10 connected over the network 20 with the search system 200. As described above with respect to FIG. 2, the network 20 may be one of any number of different types of networks such as the Internet.

As set forth above, the search engine 220 may search an index from the storage components 240 upon receiving a user query. A crawler within the search engine 220 may build the index by traversing the information sources 30 and indexing keywords pertaining to the traversed information sources 30. The search engine 220 may respond to a user query by matching terms in the user query with terms in the storage area 240. Ultimately, the search system 200 will provide the user with a result set. The user interface may include an edit mode option, which will allow the user to provide feedback pertaining to the results.

Figure 3:
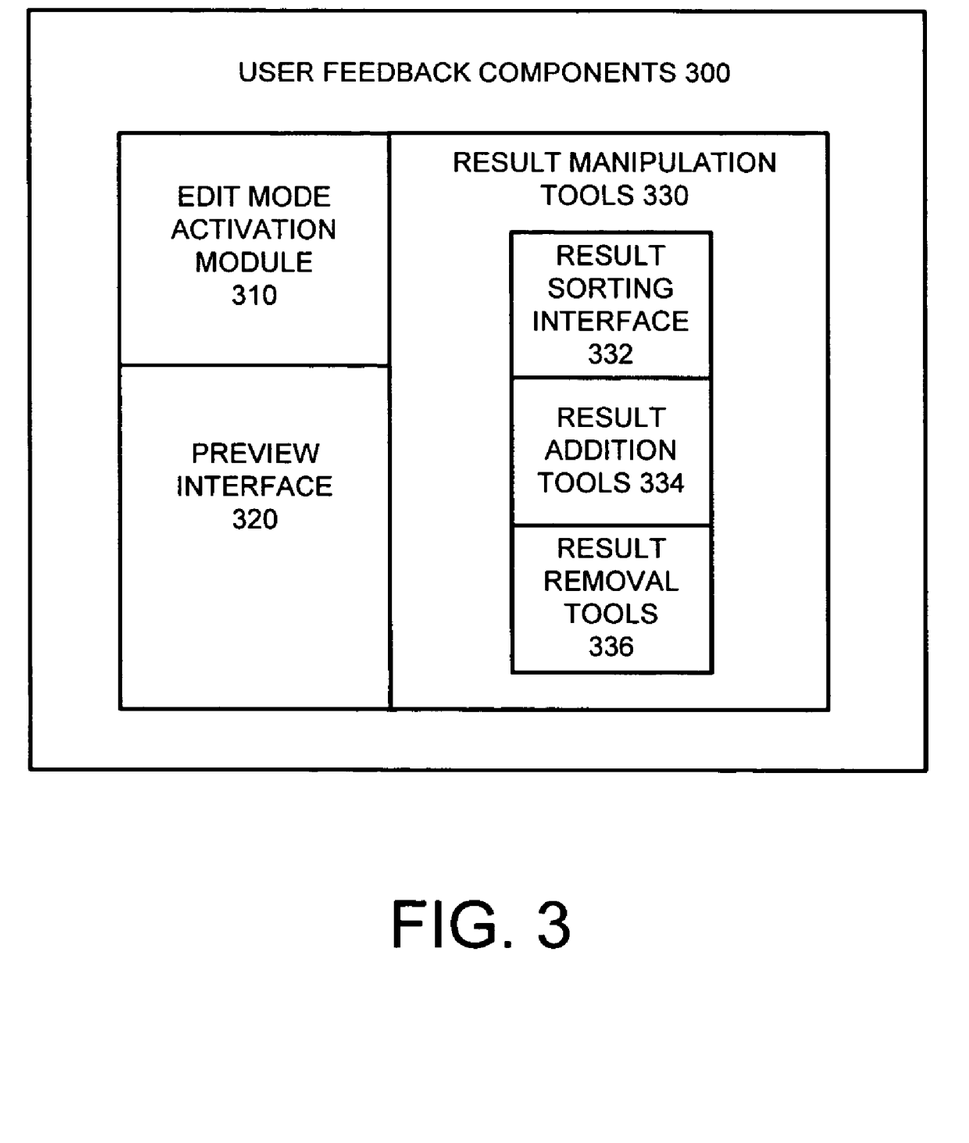
FIG. 3 is a block diagram illustrating user feedback components in accordance with an embodiment of the invention.

FIG. 3 is a block diagram illustrating user feedback components 300 in accordance with an embodiment of the invention. The user feedback components 300 may include an edit mode activation module 310 and a preview interface 320. The edit mode activation module 310 could be triggered by a "help us improve" button or other similar button presented on a user interface along with initially produced search results. Thus, the user, upon viewing the search results page, will be able to switch with one click into edit mode. The user feedback components 300 may also include result manipulation tools 330 for assisting the user with editing tasks. The result manipulation tools 330 may include a result sorting interface 332, result addition tools 334, and result removal tools 336.

Figure 4:
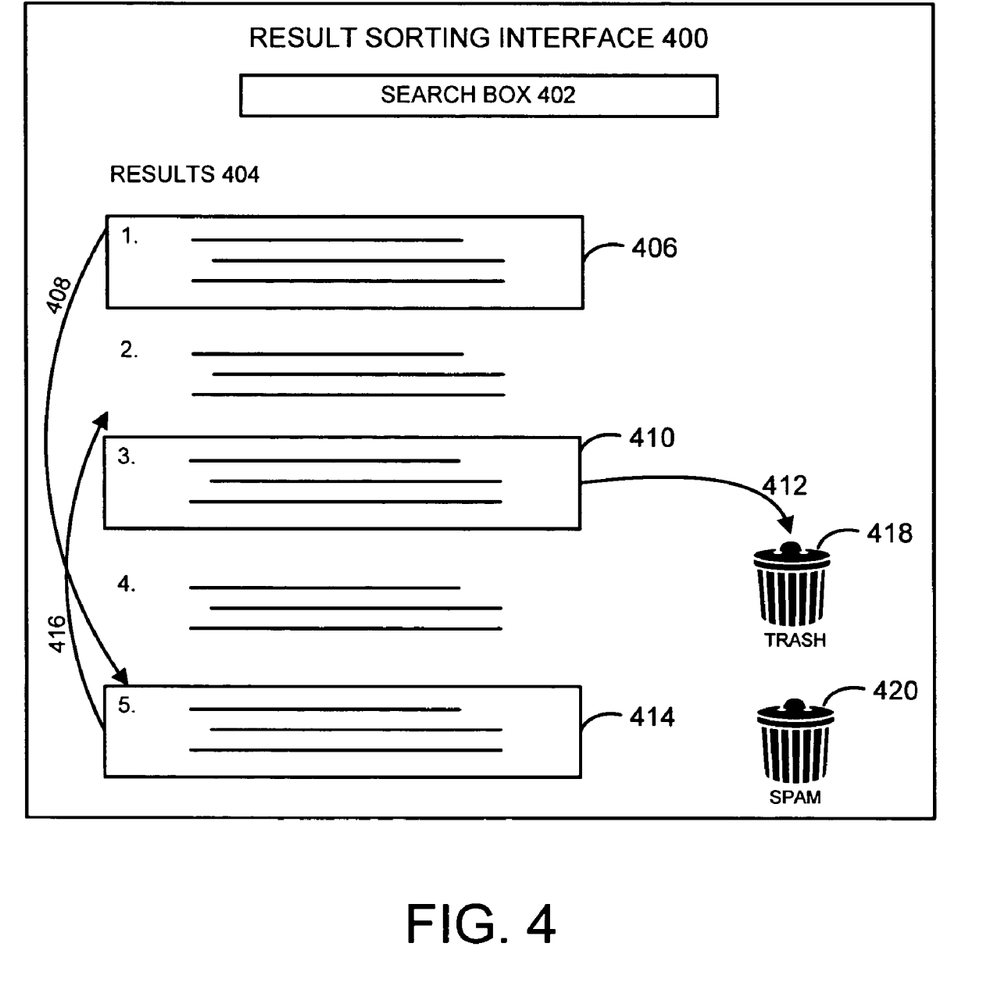
FIG. 4 is a block diagram illustrating a user interface for result sorting in accordance with an embodiment of the invention.

FIG. 4 illustrates a first embodiment of a result sorting interface 400. The result sorting interface 400 may include the usual search text entry box 402 with results 404. The illustrated results are numbered 1, 2, 3, 4, and 5. A user may manipulate the results to re-order them with respect to relevance. The user may also elect to deposit results in a trash can 418 or a spam can 420.

If the user views result number 1 as less relevant than result numbers 2, 3, and 4, the user may select result number 1 as shown by the selection box 406, and drag and drop the result below result number 4 as shown by the arrow 408. The user may determine that result number 3 is completely irrelevant. In this instance, the user may select result number 3 as shown by the selection box 410 and drag result number 3, as shown by the arrow 412, and drop result number 3 into the trash can 418. A user also may determine that some results are more relevant than the search engine judged them to be. For instance, the user may determine that result number 5 is more relevant than result number 3 and result number 4. Thus, the user selects result number 5 as shown by the selection box 414. The user can drag result number 5, as shown by the arrow 416, to a position above result number 3.

In a sample user scenario, an end user queries a search engine for "Seattle restaurants 98112". The search engine produces results that the user believes are not as good as they could be. The user toggles the search results page into edit mode using the edit mode activation module 310 so that she can improve the results. For instance, she may drag result number 1 down below result number 4 and she will see the results re-order instantly on the edit mode page. She may find that result number 3 and result number 6 are not useful and therefore will drag them to the trash can 418. Result number 3 and result number 6 then instantly disappear from the edit mode results page. The user may then insert a new result in the number one position by creating a new result slot and providing the or other location index of a search result that wasn't presented at all in the original result set. If the user is satisfied that she has created a better result set for her query, she may submit the results, for example by clicking a "submit button". The submission action may send the edits to the feedback database 390. The search system 200 may subsequently implement this user's ideal result set as stored in the database 390 in conjunction with its measurement and ranking system to either manually or automatically improve the search results for all users.

As described above, multiple editing functions including re-ordering, removal, and addition of results may take place. To implement re-ordering, the user may select or grab an existing result and drag it to a new position. The revised ordering can be reflected in the user interface for clarity before the user releases the result into the new position a number of ways. For example, the user interface may display a line in the result's new slot and shift the other results into their new positions.

The removal editing function may also include graphical user-friendly features. To remove a result, the user may drag the existing result into the trash can or other provided user interface element. The result then may disappear from the result set entirely or become faded or labeled as "trashed". In embodiments of the invention, an additional disposal icon may be provided for disposing of adult-oriented material or spam and the user interface may respond as described above.

To write-in a new result, the user may click on a provided "Add New Result" button. In embodiments of the invention, the user interface may provide an empty text field labeled "URL" or "locator index" at the top of the result list. The user can then write in the added URL or other locator index and order it as desired.

Figure 5:
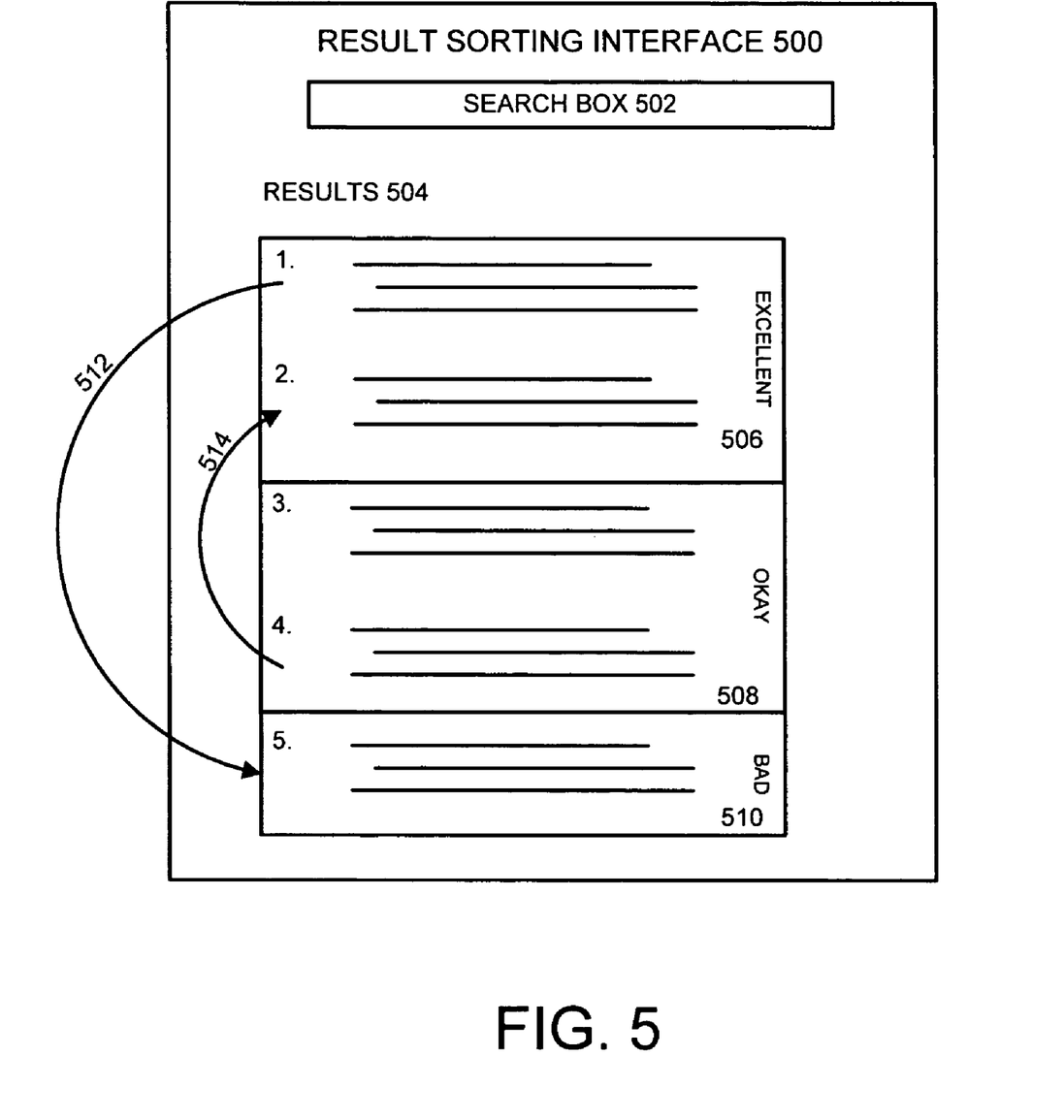
FIG. 5 is a block diagram illustrating a result sorting interface in accordance with an alternative embodiment of the invention.

FIG. 5 illustrates a result sorting interface 500 in accordance with an alternative embodiment of the invention. The result sorting interface 500 may include a search text entry box 502 and search results 504. In the illustrated embodiment, the provided search results are numbered 1, 2, 3, 4, and 5. Configurable search buckets are delineated by lines 506, 508, and 510. The search bucket above line 506 may be an "excellent" search bucket. The search bucket above line 508 may be an "okay" search bucket, and the search bucket above line 510 may be a "bad" search bucket. As illustrated, the user may select results and drag them to an appropriate bucket. In the illustrated embodiment, the user has dragged result number 1, as shown by arrow 512, into the bucket above line 510. The user has dragged result number 4 into the bucket above line 506.

The bucketing embodiment of FIG. 5 may be simple for users to implement since often times, a user may view several search results as equally relevant. With the bucketing embodiment, the user would avoid the frustration of discretely ordering results. The bucket embodiment may also maintain an advantageous relationship with the measurement and ranking system associated with the search system 200.

The editing operations in the embodiment of FIG. 5 are similar to those described above with respect to FIG. 4. Upon entry of edit mode, the system produces a user interface that may include divider lines forming the edges of boxes 506, 508, and 510. The user may be able to drag these divider lines up and down to create the distinct relevance buckets. For example, if there a three relevance buckets, there must be at least two divider lines, for example, 506 and 508, in the user interface. The user can thus manipulate the divider lines 506 and 508 and carve up the results into the three sections described above with respect to FIG. 5. In embodiments of the invention, the UI may include colored shading or colored outlines of the bucketed regions to help the user visually differentiate between the buckets. Similarly to the scenario shown in FIG. 4 above, the user can drag results from one section to another and add new results.

Anti-fraud measures may be applied so that incorrect or maliciously entered data isn't intentionally passed into the feedback system. Generally, the fact that users are entering the edit mode with frequency for any given query or class of queries could be used to identify unsatisfactory search results. However, if multiple users provide conflicting advice using the edit mode on how to improve results for the same search query, a simple arbitration system may be implemented to merge them into a single ideal set. Furthermore, the system may maintain IP addresses along with ideal result sets and perform analysis of the relationships between these IP addresses and ideal result sets in order to ensure consistency and the absence of fraud. As another measure, the system may compare ideal result sets created by a particular user with other recorded satisfaction percentage data to determine if that particular user is attempting to decrease a ranking for a particular result.

Figure 6:
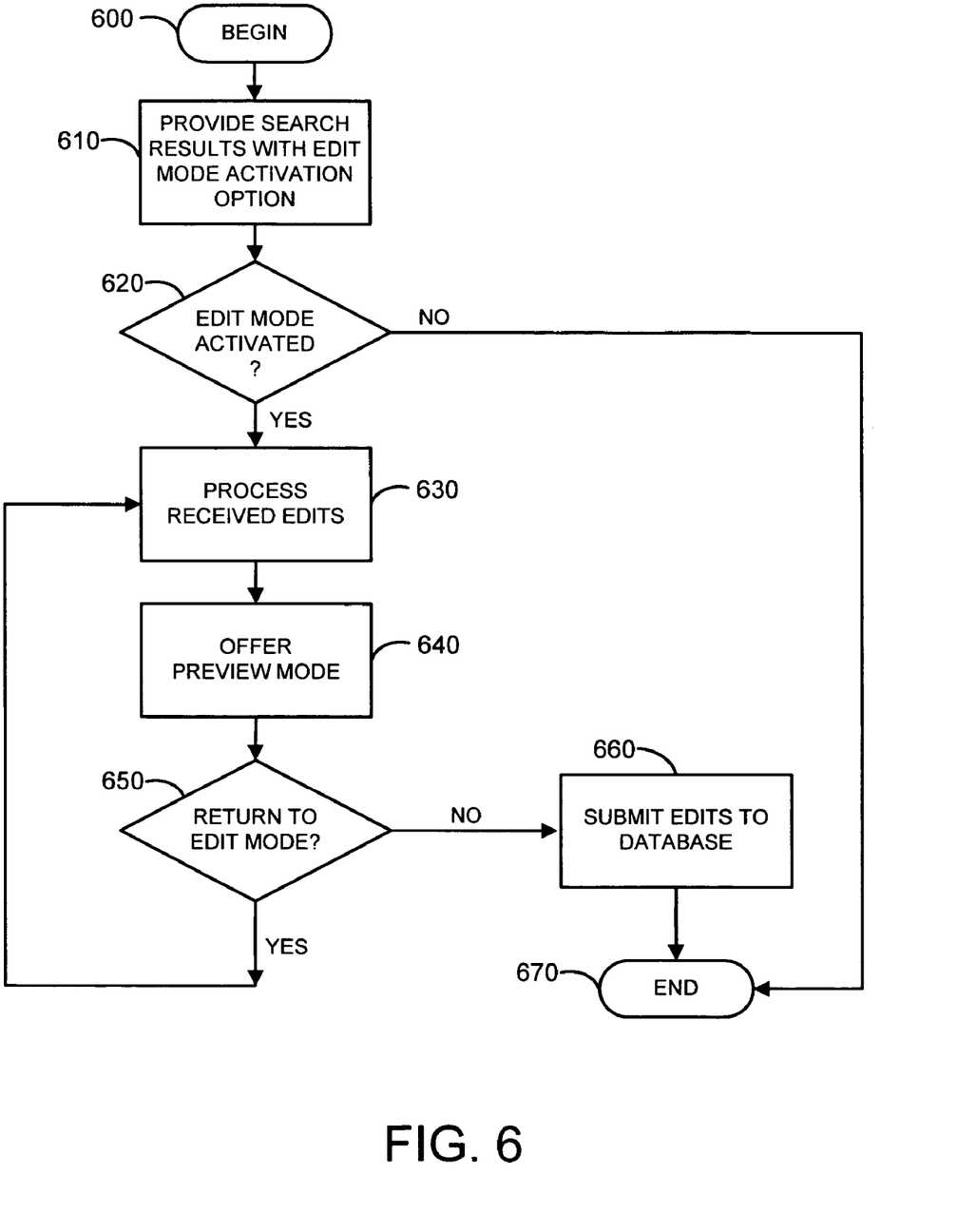
FIG. 6 is a flow chart illustrating a process for obtaining user feedback in accordance with an embodiment of the invention.

FIG. 6 is a flow chart illustrating a method for facilitating user feedback in accordance with an embodiment of the invention. As illustrated, the method may begin in step 600 and the system may provide search results with an option to activate an edit mode in step 610. In step 620, the system may determine if the edit mode has been activated. If the edit mode has been activated, the system processes the received edits in step 630. In step 640, the system offers a preview mode. If the user elects to return to edit mode in step 650, the system returns to processing the received edits in step 630. If the user is satisfied with the results as shown in the preview mode, the system submits the edits to the user feedback database 390 in step 660 and the process ends in step 670.

In summary, editing activities may take place within the traditional web interface and are not dependent on installation of tools or special applications. Accordingly, the user's participation is simple as well as visually appealing.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer system for facilitating user feedback pertaining to search results produced by a search system in response to an input user query, the system comprising:
    a processing unit; and
    a memory for storing computer-executable instructions that when executed by the processing unit executes:
        an edit mode activation option provided in conjunction with the search results, wherein the edit mode activation option is used to edit the search results received in response to the input user query;
        result manipulation tools triggered in response to a user selection of the edit mode activation option, the result manipulation tools allowing the user to manipulate the search results based on the user's perceived relevance of the search results with respect to the input user query, such manipulation including at least one of adding, removing, and sorting the search results; and a feedback receiving mechanism for receiving and storing the user-manipulated search results such that the user-manipulated search results are used to provide improved subsequent search results in response to another user query input by a second user.

2. The system of claim 1, wherein the result manipulation tools comprise a sorting interface that allows the user to interactively sort results.

3. The system of claim 2, wherein the sorting interface comprises a re-ordering interface that allows the user to re-order the search results in descending order based on relevance.

4. The system of claim 3, wherein the sorting interface allows the user to drag and drop results in the selected descending order.

5. The system of claim 2, wherein the sorting interface comprises multiple buckets, wherein each bucket represents a relevance category and the result manipulation tools allow the user to deposit each result in a bucket.

6. The system of claim 2, wherein the sorting interface further comprises a result removal component for allowing the user to dispose of an irrelevant result.

7. The system of claim 2, wherein the sorting interface further comprises a spam category for disposal of spam results.

8. The system of claim 2, further comprising a preview interface for allowing previewing of edited results.

9. The system of claim 1, wherein the feedback receiving mechanism comprises a feedback database.

10. A computer readable storage media having computer-executable instructions stored thereon that executes a method for facilitating user feedback pertaining to search results produced by a search system in response to an input user query, the method comprising:

providing an edit mode activation option in conjunction with the search results, wherein user selection of the edit mode activation option triggers a feedback interface including result manipulation tools;

manipulating results in accordance with user input to the result manipulation tools, wherein the user input comprises manipulations of the results based on the user's perceived relevance of the results with respect to the input user query, such manipulation including at least one of adding, removing, and sorting the search results; and storing the manipulated results for use by a ranking system such that the manipulated results are used for subsequent search results to improve the subsequent search results for any user that inputs a related user query.

11. The method of claim 10, further comprising providing a sorting interface that allows the user to interactively sort results.

12. The method of claim 11, further comprising providing a reordering interface including drag and drop capability that allows the user to re-order the search results in descending order based on relevance.

13. The method of claim 11, further comprising providing multiple buckets on the sorting interface, wherein each bucket represents a relevance category and the result manipulation tools allow the user to deposit each result in a bucket.

14. The method of claim 11, further comprising providing a result removal component for allowing the user to dispose of an irrelevant result.

15. The method of claim 11, further comprising providing a spam disposal mechanism.

16. The method of claim 11, further comprising providing a preview interface for allowing previewing of edited results.

17. The method of claim 10, further comprising implementing user feedback as input for a search result personalization system.

18. A computer-implemented method, performed via a computer having storage, for facilitating user feedback pertaining to search results produced by a search system in response to an input user query, the method comprising:

providing an edit mode activation option in conjunction with a first set of search results, wherein user selection of the edit mode activation option triggers a feedback interface including result manipulation tools;

manipulating the first set of search results in accordance with a first user input from a first user, via an input device, to the result manipulation tools, wherein the first user input comprises manipulations of at least a portion of the first set of search results relative to one another based on the first user's perceived relevance with respect to a first input user query, such manipulation including at least one of adding, removing, and sorting, the search results;

providing a preview pane for reviewing the manipulated results via a display device prior to submission;

receiving a first user submission of manipulated results and storing the manipulated results in a feedback database for use by a ranking system such that the manipulated results are used for subsequent search results to improve the subsequent search results for a second user;

receiving a second input user query from a second user at a later time; and utilizing the first user submission of manipulated results and the second input user query to provide a second set of search results to the second user at the later time.

19. The method of claim 18, further comprising allowing the user to trigger the edit mode activation option in order to make additional edits after previewing.

* * * * *

UNITED STATES PATENT AND TRADEMARK OFFICE
CERTIFICATE OF CORRECTION

PATENT NO. : 7,596,558 B2 Page 1 of 1
APPLICATION NO. : 11/107870
DATED : September 29, 2009
INVENTOR(S) : Brewer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Twenty-eighth Day of September, 2010

David J. Kappos
*Director of the United States Patent and Trademark Office*